United States Patent
Bell et al.

(10) Patent No.: US 10,218,603 B2
(45) Date of Patent: Feb. 26, 2019

(54) MULTICAST MESSAGE TRANSLATION IN A NETWORK DEVICE

(71) Applicant: ABL IP Holding LLC, Decatur, GA (US)

(72) Inventors: Robert Bell, Erin (CA); Kevin D. Loewen, Calgary (CA); Garrett Douglas, Calgary (CA); Maurits Van Der Hoorn, Calgary (CA)

(73) Assignee: ABL IP Holding LLC, Atlanta, GA (US)

( * ) Notice: Subject to any disclaimer, the term of this patent is extended or adjusted under 35 U.S.C. 154(b) by 158 days.

(21) Appl. No.: 15/287,824

(22) Filed: Oct. 7, 2016

(65) Prior Publication Data

US 2017/0104669 A1   Apr. 13, 2017

Related U.S. Application Data

(60) Provisional application No. 62/239,106, filed on Oct. 8, 2015.

(51) Int. Cl.
| | |
|---|---|
| *H04L 12/18* | (2006.01) |
| *H04L 29/06* | (2006.01) |
| *H04L 12/761* | (2013.01) |
| *H04L 12/931* | (2013.01) |

(52) U.S. Cl.
CPC .............. *H04L 45/16* (2013.01); *H04L 12/18* (2013.01); *H04L 49/201* (2013.01); *H04L 69/08* (2013.01); *H04L 69/18* (2013.01); *H04L 12/185* (2013.01)

(58) Field of Classification Search
CPC ....... H04L 45/16; H04L 12/18; H04L 49/201; H04L 69/08; H04L 169/18
USPC .......................................................... 370/390
See application file for complete search history.

(56) References Cited

U.S. PATENT DOCUMENTS

| | | | | |
|---|---|---|---|---|
| 7,154,891 | B1 * | 12/2006 | Callon | .............. H04L 29/12009 370/392 |
| 8,582,581 | B2 | 11/2013 | Kletti | |
| 9,838,322 | B2 * | 12/2017 | Basso | ................. H04L 47/2433 |

(Continued)

OTHER PUBLICATIONS

"ANSI E1.31", Entertainment Technology Lightweight streaming protocol for transport of DMX512 using ACN. http://tsp.esta.org/tsp/documents/docs/E1-31-2016.pdf, 2016, 40 pages.

(Continued)

*Primary Examiner* — Christopher R Crompton
(74) *Attorney, Agent, or Firm* — Kilpatrick Townsend & Stockton LLP

(57) ABSTRACT

Disclosed are various embodiments for translating multicast messages in a network device. The network device obtains a configuration for translating a destination address of a specified type of multicast message to a different destination address. A multicast message is received that matches the specified type. A broadcast message is generated based upon the multicast message and the configuration, where the broadcast address used as a destination for the broadcast message corresponds to the broadcast address for a group of network nodes specified by the configuration. The broadcast message is transmitted from one or more network interfaces specified by the configuration. The broadcast message includes the instruction for the group of network nodes.

20 Claims, 5 Drawing Sheets

(56) References Cited

U.S. PATENT DOCUMENTS

| | | | |
|---|---|---|---|
| 2006/0198394 A1* | 9/2006 | Gotoh | H04L 12/1836 370/469 |
| 2009/0232138 A1* | 9/2009 | Gobara | H04L 12/4633 370/392 |
| 2011/0075664 A1* | 3/2011 | Lambeth | H04L 45/04 370/390 |
| 2013/0242929 A1* | 9/2013 | Gorgen | H04L 45/36 370/329 |
| 2016/0227385 A1* | 8/2016 | Ahmad | H04L 65/4061 |
| 2017/0104605 A1 | 4/2017 | Bell et al. | |

OTHER PUBLICATIONS

"Art-Net 3", Specification for the Art-Net 3 Ethernet Communication Standard, 2002-2011, 39 pages.

"DRAFT BSR E1.31, Entertainment Technology—Lightweight streaming protocol for transport of DMX512 using ACN", Entertainment Services and Technology Association, Revision 0.46 Oct. 23, 2008, CP/2006-1020R3, 2008, 20 pages.

"IEEE Standard for Ethernet", IEEE Computer Society, IEEE Std 802.3™, (Revision of IEEE Std 802.3-2008), Dec. 28, 2012, 634 pages.

Holbrook et al., "Using Internet Group Management Protocol Version 3 (IGMPv3) and Multicast Listener Discovery Protocol Version 2 (MLDv2) for Source-Specific Multicast," The Internet Society., Aug. 2006, 11 pages.

Non-Final Office Action for U.S. Appl. No. 15/287,802, dated Feb. 26, 2018, 24 pages.

U.S. Appl. No. 15/287,802, "Notice of Allowance," dated Jul. 2, 2018, 9 pages.

* cited by examiner

MULTICAST MESSAGE TRANSLATION IN A NETWORK DEVICE

CROSS-REFERENCE TO RELATED APPLICATIONS

This application claims priority to U.S. Provisional Application No. 62/239,106 entitled "MESSAGE TRANSLATION IN A NETWORK DEVICE" filed Oct. 8, 2015, which is incorporated herein by reference for all purposes.

BACKGROUND

Some protocols used over networks are based on multicast messages for communicating among nodes in the network. For example, in networks used for communication among lighting and other stage production equipment (sometimes referred to as "entertainment networks"), control consoles using multicast-based protocols may be employed to manage various different groups of nodes. Protocols that use multicast messages efficiently scale to large numbers of nodes because network devices, such as a network switch, can filter out the multicast messages that are not associated with a node on a given network interface. As a result, a given node is less likely to receive and be burdened with decoding messages that are not relevant to the respective node.

However, some nodes may be incapable of communicating using multicast-based protocols; often such devices instead communicate using protocols based on broadcast messages. As the size of the network grows, the network traffic produced by such broadcast-based protocols can overload some nodes since each of the broadcast messages are flooded throughout the network. Nodes with limited processing and memory capacity are especially susceptible as it may be necessary for individual nodes to receive the entire broadcast message, cache it, and decode the message before determining if the message is relevant to itself or not (e.g., the message was for another node). Thus, it is desirable to limit the extent to which broadcast messages are used in the network. What is needed is a network device that can translate multicast messages received from control consoles or other nodes into broadcast messages for those nodes or other devices that communicate via broadcast messages.

SUMMARY

Various aspects of the present invention relate to a network device for translating specified types of multicast messages to corresponding types of broadcast messages. The network device obtains a configuration for translating a destination address of a specified type of multicast message to a different destination address. The configuration may contain one or more sets, where each set can identify a type of message and a corresponding change to be made to the message. Subsequently, the network device may receive a multicast message matching the specified type. The multicast message may be received from a control console and may include an instruction for a group of network nodes. The network nodes may be gateways, lighting equipment, and/or other types of stage production equipment.

The network device generates a broadcast message based upon the multicast message and the configuration. The broadcast address used as a destination for the broadcast message corresponds to the broadcast address for the group of network nodes specified by the configuration. The broadcast message is transmitted from one or more network interfaces of the network device. The one or more network interfaces of the network device are those of the network interfaces that are specified by the configuration. The network device may also transmit the multicast address to one or more network interfaces. The association of the multicast address with the individual network interfaces may occur from a manual configuration of the network device and/or from Internet Group Management Protocol (IGMP) snooping of IGMP messages for the broadcast group received on the respective network interface. The broadcast message transmitted from the network device includes the instruction for the group of network nodes from the multicast message. The instruction may be received by the gateways and provided to the light and/or other stage production equipment.

In some implementations, the network device can translate messages from broadcast to multicast instead of or in addition to translating messages from multicast to broadcast. The translation of messages from broadcast to multicast may be configured independently of any configuration to translate messages from multicast to broadcast.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
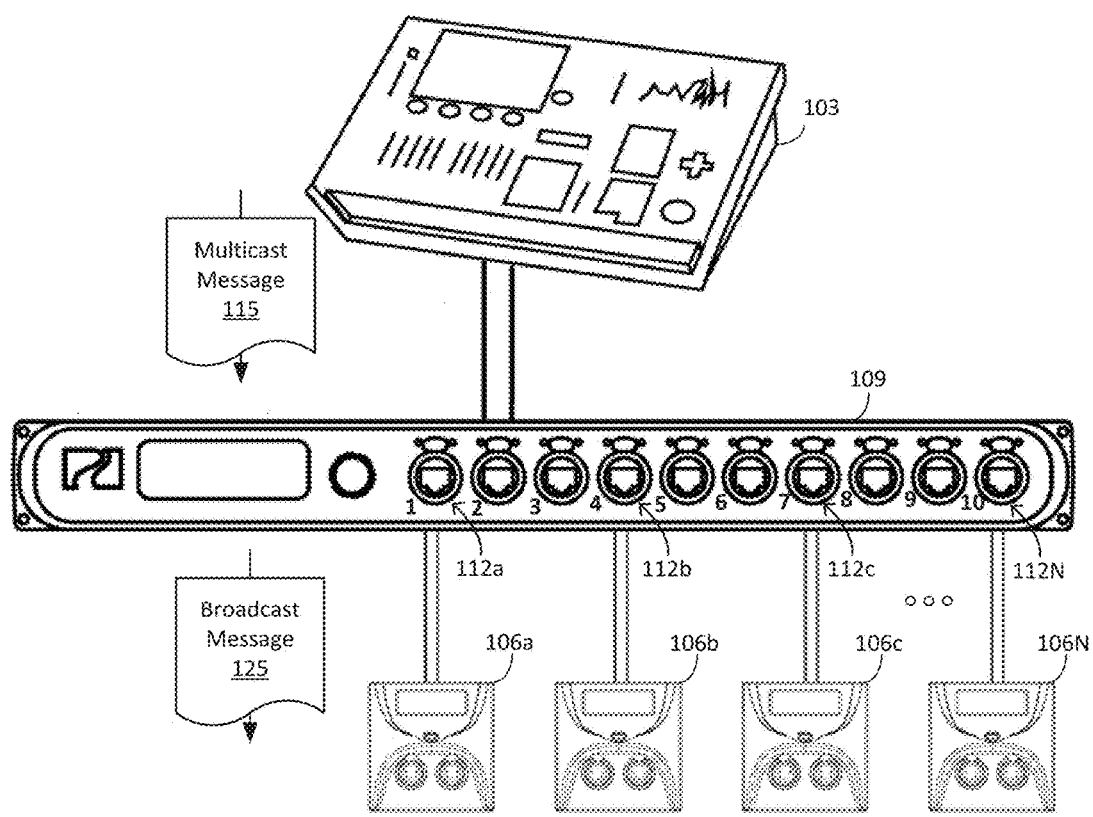
FIG. 1 is a drawing of a networked environment according to various embodiments of the present disclosure.

Embodiments of the present invention are generally directed to translating between multicast and broadcast messages. In some embodiments, a network device translates specified types of multicast messages received via a network into corresponding broadcast messages. The translation of the multicast messages is directed based upon a configuration for the network device that specifies criteria for one or more various types of multicast messages and a corresponding broadcast address to be used in translating each type of multicast message. In other embodiments, a network device translates specified types of broadcast messages received via the network into corresponding multicast messages, as directed by the configuration. With reference to FIG. 1, shown is an exemplary networked environment 100 illustrating the multicast to broadcast message translation, such as may be implemented as part of an entertainment network. The networked environment 100 includes a control console 103 and various nodes 106a . . . N, which are in data communication via a network facilitated by a network device 109.

The network can include, for example, one or more Ethernet networks, as well as the other possible local area networks (LANs), wide area networks (WANs), etc., or any combination of two or more such networks. The network device 109 comprises a device with two or more interfaces 112a . . . N, including physical and/or virtual interfaces, with which a network is established among the console 103 and one or more nodes 106. As a non-limiting example, the network device 109 may be implemented as a network switch (e.g., an Ethernet switch), a server computing device, a network router, or other possible processor-based device capable of establishing a network.

Within an entertainment network, such as shown in the networked environment 100, the control console 103 may comprise a device for managing lighting and/or other stage production equipment made up of the various nodes 106. The nodes 106 can comprise any device capable of communicating on the network, including lighting and/or other stage production equipment, as well as gateway devices that may facilitate communication between devices operating under different protocols. For example, the console 103 may use the ANSI E1.31 Streaming Architecture for Control Networks (sACN) protocol, while lighting equipment to be controlled by the console uses the DMX512 ("Digital Multiplex with 512 pieces of information") protocol, thus a node 106 may act as a gateway between the different protocols of the console 103 and the lighting equipment. Some nodes 106 may only receive data, while other nodes 106 may transmit data to the console 103 and/or to other nodes.

Next, a general description of the operation of the various components of the networked environment 100 is provided. To begin, the console 103 transmits an instruction to be received by a group of one or more nodes 106, where the instruction can include, for example, an adjustment to a color or dimming level of a light, a status message, audio/video data, and or other types of data as can be appreciated. As described above, some of the nodes may act as a gateway device for stage production equipment (e.g., lighting equipment), while, in some implementations, a portion of the nodes themselves are the stage production equipment. The instruction is transmitted from the console 103 to the network device 109 using one or more multicast messages 115. Unless configured otherwise, a conventional network switching device would receive the multicast message 115 on an interface, then transmit the multicast message to each of its remaining interfaces that are configured to receive messages for the multicast group. However, one or more of the nodes 106 to which the console 103 has directed the instruction may not be capable of recognizing and/or decoding the multicast message 115.

Accordingly, using the techniques disclosed herein, the network device 109 first receives a configuration specifying criteria for one or more types of multicast messages and corresponding broadcast destination address information to which each type of multicast message should be mapped. As such, if the multicast message 115 received by the network device 109 matches the various criteria specified in the configuration, the network device 109 may then generate a broadcast message 125 to be delivered to one or more of the associated nodes 106, where the broadcast message 125 has a broadcast destination address and is based on the content of the multicast message 115. In addition, the network device 109 may also deliver the multicast message 115 to one or more of the nodes 106 that have been configured to receive such multicast messages. For example, the network device 109 may be configured to translate a multicast message received from the console into a broadcast message to be forwarded to node 106a via interface 1, while the nodes 106b and 106c should receive the multicast message via interfaces 4 and 8, respectively. As described above, in some implementations, the network device 109 can also translate, based on the configuration, messages from broadcast to multicast instead of or in addition to translating messages from multicast to broadcast.

Figure 2:
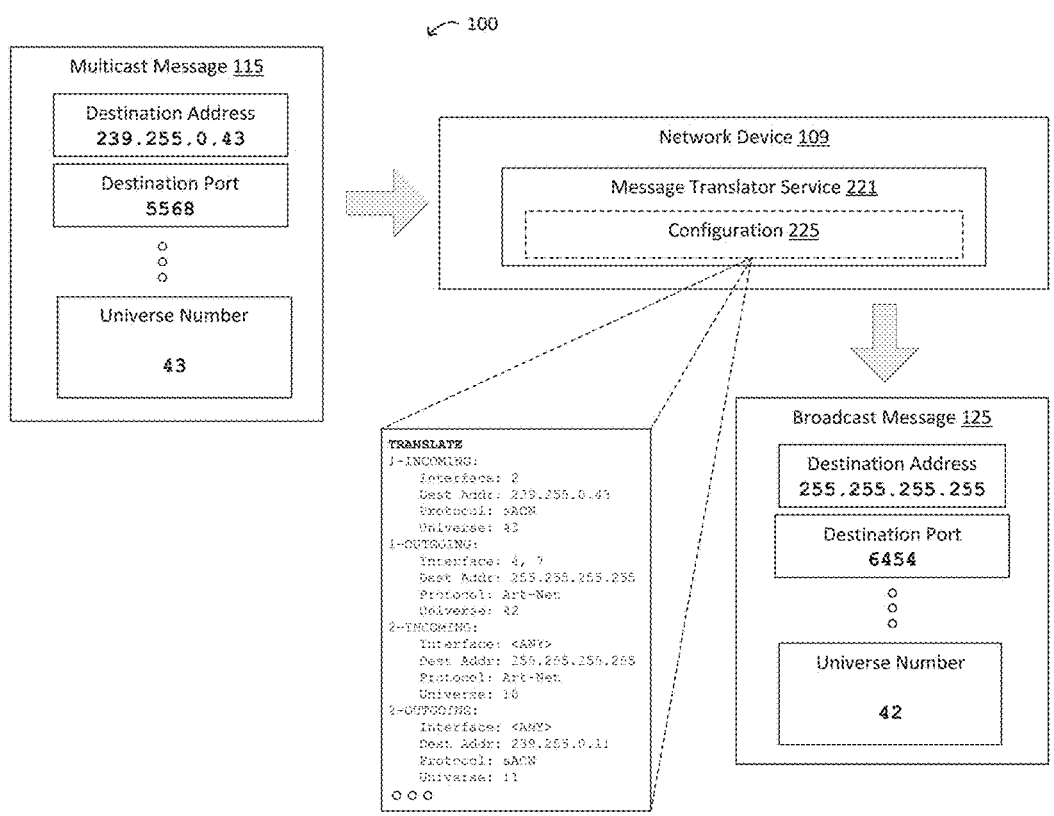
FIG. 2 is a functional block diagram of a networked environment according to various embodiments of the present disclosure.

With reference to the functional block diagram shown in FIG. 2, the network device 109 may perform the translation of messages between multicast and broadcast by executing the message translator service 221 and potentially other applications, services, processes, systems, engines, or functionality not discussed in detail herein. The message translator service 221 is configured based on the received configuration 225, an exemplary excerpt of which is illustrated in FIG. 2 and discussed in part below. As shown, the first ruleset of configuration 225 specifies that message translator service 221 should match incoming messages meeting all of the criteria that:
 1. the message is received on interface '2' (the interface for the console 103 in FIG. 1);
 2. the message has a destination address of '239.255.0.43', an Internet protocol (IP) address that identifies the message as a multicast message;
 3. the message complies with the sACN protocol; and
 4. the sACN universe number is '43'.

Continuing, for messages that match the aforementioned criteria for a type of incoming multicast message, the outgoing portion of the first ruleset of configuration 225 specifies that the message translator service 221 should generate a broadcast message:
 1. on interfaces '4' and '7' of the network device 109 (the interfaces for the nodes 106b and 106c in FIG. 1);
 2. with a destination address of '255.255.255.255', an IP address from an address range that identifies the message as a broadcast message;
 3. that complies with the Art-Net protocol; and
 4. that uses universe '42' of the Art-Net protocol.

As can be appreciated, the excerpt of the configuration 225 is shown for illustrative purposes only and may be implemented with different possible criteria and actions, as well as additional sets of criteria and corresponding actions for translating other types of messages. For example, the configuration 225 may specify translating other types of multicast messages to broadcast messages and/or translating types of broadcast messages to multicast messages (e.g., the second ruleset shown for configuration 225). Translation from broadcast to multicast may be performed, for example, when a control console, node, or other device transmits a broadcast message via the network device 109, but one or more of the nodes 106 intended to receive the broadcast message are configured to receive only multicast messages. In some implementations, the configuration 225 allows the interfaces to be specified as '<any>' interface (e.g., the second ruleset shown for configuration 225). For example, the use of '<any>' in the incoming direction allows incoming messages to match regardless of the interface on which it was received, while the use of '<any>' in the outgoing direction allows the message to be transmitted out any interface.

Moving on, once the message translator service 221 has been configured with the configuration 225, the incoming multicast message 115 is compared to the type of multicast message specified by the criteria in the configuration. It should be noted that the multicast message 115 and the broadcast message 125 may also contain additional and/or different data (e.g., headers, payloads, etc.) than what is represented in FIG. 2. In this instance, the incoming multicast message 115 matches the criteria shown in FIG. 2 since (1) it was received from the console 103 on interface '2' (see FIG. 1); (2) the destination address of the multicast message 115 is '239.255.0.43'; (3) the sACN protocol is used (as indicated by use of the reserved port number '5568', among other possible protocol identification techniques); and (4) the universe number of the message is '43'.

As a result of the match, the message translator service 221 generates a broadcast message 125 based on the multicast message 115 and the configuration 225. In particular, the configuration 225 specifies that, based on a multicast message matching the criteria above, the message translator service 221 will generate the broadcast message 125: (1) to be forwarded out interfaces '4' and '7'; (2) with a IP broadcast destination address of '255.255.255.255'; (3) to comply with the Art-Net protocol, including using the reserved port number '6454'; and (4) to have a universe number of '42'. The remaining data of the broadcast message 125 may be made up of data from the multicast message 115, except where changes due to translation dictate otherwise. For example, the payload from the multicast message 115 may be imported into the broadcast message 125, while other data, such as checksums are revised as needed.

Returning to FIG. 1, once the broadcast message 125 is generated based on the received multicast message 115, the broadcast message 125 is transmitted from the specified network interfaces 112 of the network device 109 to be received by the various nodes 106. In some implementations, when particular interfaces 112 are specified in the outgoing direction, the translated message (e.g., the broadcast message 125) may be transmitted from only the specified interface(s), whereby transmission is withheld from remaining interfaces.

However, the original message (e.g., the multicast message 115) may still be transmitted from interfaces 112 of the network device 109 independently from the transmission of the translated message. For example, the multicast message 115 may be transmitted from any interface 112 of the network device 109, including interfaces '4' (interface 112b) and '7' (interface 112c) from which the broadcast message 125 may be transmitted. In other implementations, the network device 109 can also perform additional filtering of the multicast messages, whereby the network device associates a particular multicast address with one or more of the interfaces 112. By performing the filtering, the only multicast messages forwarded out an interface 112 are those messages whose multicast destination address is expressly associated with the respective interface.

For example, interfaces 112a and 112c may be associated with multicast destination address '239.1.1.1', and interfaces 112a and 112b may be associated with multicast destination address '239.2.2.2'. Thus, a multicast message with a destination address of '239.1.1.1' is forwarded out interfaces 112a and 112c (and not interface 112b), while a multicast message with a destination address of '239.2.2.2' is forwarded out interfaces 112a and 112b (and not interface 112c). The association of a multicast address with an interface 112 may be created in the network device 109 by manual configuration (e.g., via a user interface when the message translator service 221 is configured), by the network device 109 receiving IGMP messages from nodes 106 on an interface 112 (also referred to as "IGMP snooping"), and/or by other operations as can be appreciated.

Figure 3:
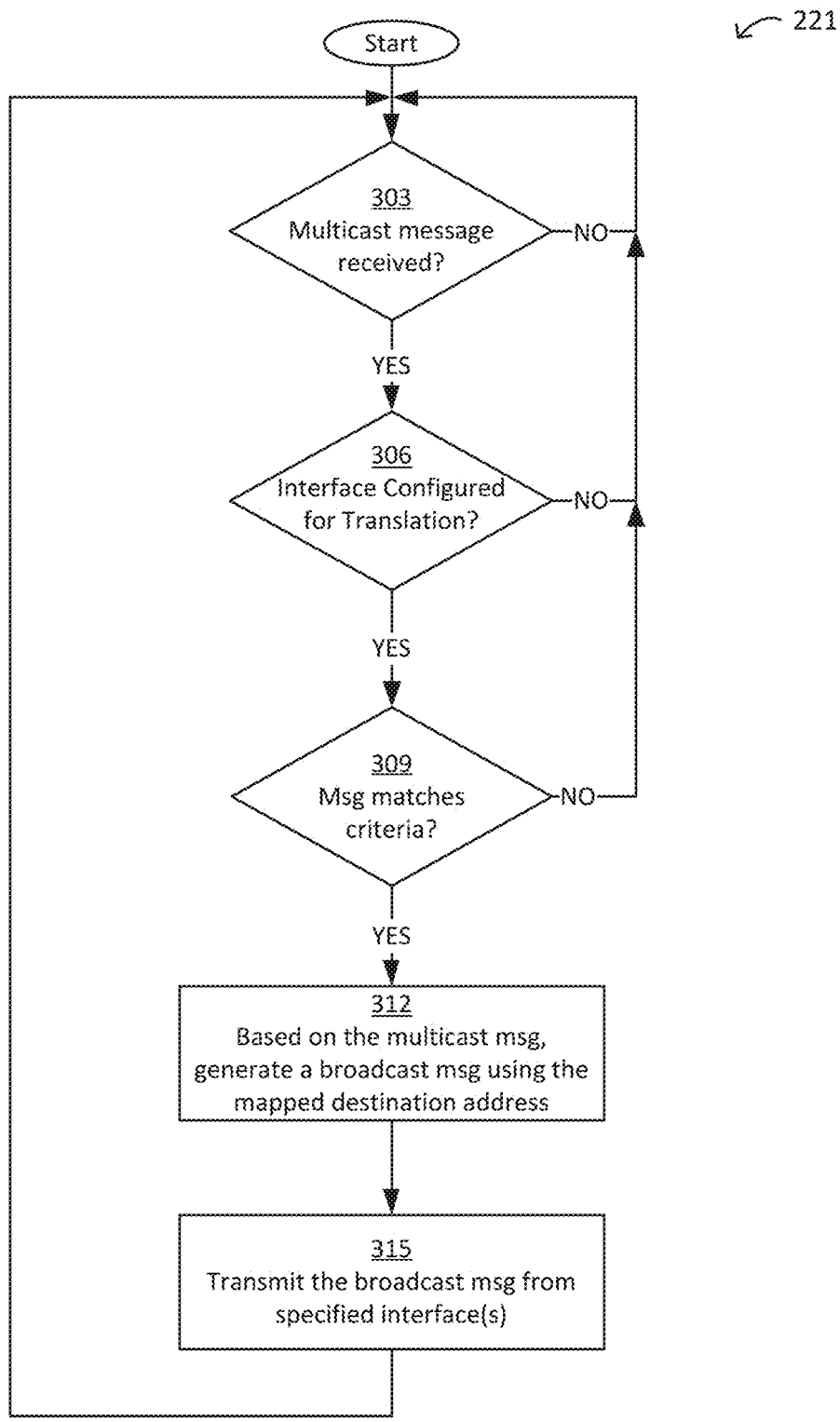
FIG. 3 is a flowchart illustrating one example of functionality implemented as portions of message translator service executed in a network device in the networked environment of FIG. 1 according to various embodiments of the present disclosure.

Referring next to FIG. 3, shown is a flowchart that provides one example of the operation of a portion of the message translator service 221 that is configured to translate messages from multicast to broadcast, according to various embodiments. It is understood that the flowchart of FIG. 3 provides merely an example of the many different types of functional arrangements that may be employed to implement the operation of the portion of the message translator service 221 as described herein. As an alternative, the flowchart of FIG. 3 may be viewed as depicting an example of elements of a method implemented in the network device 109 (FIGS. 1-2) according to one or more embodiments.

The operations depicted in the flowchart of FIG. 3 may be initiated once the network device 109 has received a message via the network and after receiving a configuration to perform translation of multicast messages. Beginning with block 303, the message translator service 221 executing in network device 109 determines if the received message is a multicast message. Identification of a message as multicast message depends upon the type of network and protocols in use on the network. For example, in networks operating with the IPv4 protocol, a multicast message may be identified based on its IP destination address within the range of addresses '224.0.0.0' to '239.255.255.255'. On networks using Ethernet protocols, which may be used in conjunction with IP, Ethernet frames with a value of one in the least-significant bit of the first octet of the destination address (e.g., '01:00:5E:00:00:00') may be identified as a multicast message. If the received message is not a multicast message, execution of the message translator service 221 returns to block 303.

Alternatively, if the message is a multicast message, in block 306, the message translator service 221 determines if the interface on which the multicast message was received is configured (in the configuration 225 or elsewhere) to translate received multicast messages. If the interface on which the multicast message was received is not configured for multicast translation, execution of the message translator service 221 returns to block 303 where the default action of the network device 109 may be undertaken for the multicast message (e.g., the multicast message may be transmitted from the remaining interfaces of the network device or transmitted from interfaces configured for the specific multicast destination address, as with IGMP snooping). Alternatively, if the interface on which the multicast message was received is configured for multicast translation, in block 309, the message translator service 221 determines if the multicast message matches the criteria specified in the configuration. For example, if the configuration specifies matching sACN multicast messages having universe number '43', but the received multicast message has a universe number of '10', then no translation of the multicast message may occur.

If the received multicast message does not match the criteria specified in the configuration, execution of the message translator service 221 returns to block 303 where the default action of the network device 109 may be undertaken for the multicast message (e.g., the multicast message may be transmitted from the remaining interfaces of the network device or transmitted from interfaces configured for the specific multicast destination address, as with IGMP snooping). Alternatively, if the received multicast message does match the criteria specified in the configuration, in block 312, the message translator service 221 generates a broadcast message that is based on the multicast message, but that has the broadcast destination address and other configuration changes specified or necessitated by the configuration 225.

Next, in block 315, the message translator service 221 causes the network device 109 to transmit the broadcast message from the one or more interfaces specified by the configuration 225. For example, the configuration 225 may expressly specify one or more interfaces from which the broadcast should transmitted. Alternatively, the configuration 225 may simply specify that the broadcast message may be transmitted from any interface. Thereafter, this portion of the message translator service 221 returns to block 303 to await receipt of additional messages.

Figure 4:
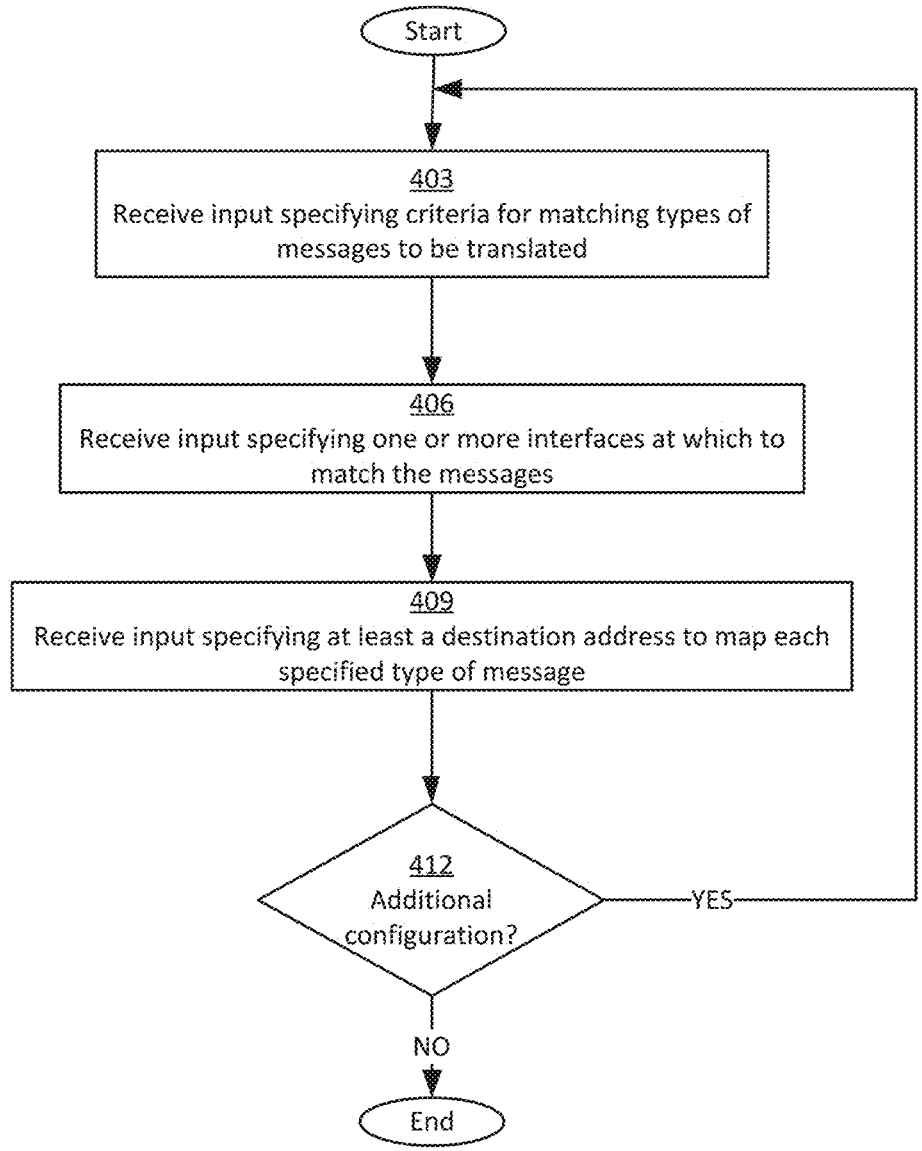
FIG. 4 is a flowchart illustrating another example of functionality implemented as portions of message translator service executed in a network device in the networked environment of FIG. 1 according to various embodiments of the present disclosure.

Referring next to FIG. 4, shown is a flowchart that provides another example of the operation of a portion of the message translator service 221 according to various embodiments. It is understood that the flowchart of FIG. 4 provides merely an example of the many different types of functional arrangements that may be employed to implement the operation of the portion of the message translator service 221 as described herein. As an alternative, the flowchart of FIG. 4 may be viewed as depicting an example of elements of a method implemented in the network device 109 (FIGS. 1-2) according to one or more embodiments.

The operations depicted in the flowchart of FIG. 4 may be initiated in response to a request to apply a configuration 225 to the message translator service 221. The request to apply the configuration 225, as well as the input received for the configuration, may be received via various interactive user interfaces (UI) of the network device 109 (e.g., web UI, command-line interface (CLI), front-panel interface, etc.) and/or via network configuration services (Simple Network Management Protocol (SNMP), Trivial File Transfer Protocol (TFTP), etc.).

Beginning with block 403, the message translator service 221 receives input specifying criteria for identifying the type(s) of messages (e.g., multicast or broadcast) to be translated. The criteria may include destination addresses/ports, source addresses/port, protocol identifiers (e.g., Art-Net, sACN, Pathport, Sandnet, etc.), header identifiers (e.g., universe number), and/or other possible criteria for identifying a type of message, as can be appreciated.

Next, in block 406, the message translator service 221 receives input specifying one or more network interfaces at which to apply or not apply the message translation to incoming messages. On interfaces in which message translation is not applied, incoming messages may be forwarded to other network interfaces of the network device 109 without regard to the message translation feature.

Then, in block 409, the message translator service 221 receives input specifying the destination address (e.g., broadcast or multicast) and potentially other changes to be made for messages corresponding to the type of message whose criteria is defined above. The other changes may include a destination port, source address/port, protocol type (e.g., Art-Net, sACN, Pathport, Sandnet, etc.), header identifier (e.g., universe number), and/or other possible changes that may be explicitly or implicitly specified. In addition, one or more network interfaces may be specified for which translation output should occur. For example, if the network device is being configured to translate incoming multicast messages to broadcast messages, it may be desirable to limit the number of network interfaces that output the translated broadcast messages in order to preserve performance of various devices on the network.

Continuing, in block 412, the message translator service 221 determines if additional configuration input is to be received, such as may be used to specify additional sets of criteria for message types and corresponding changes/actions to be applied to these messages. If additional configuration input is to be received, then execution of the message translator service 221 returns to block 403. Alternatively, if no additional configuration input is to be received, then execution of this portion of the message translator service 221 ends as shown.

Figure 5:
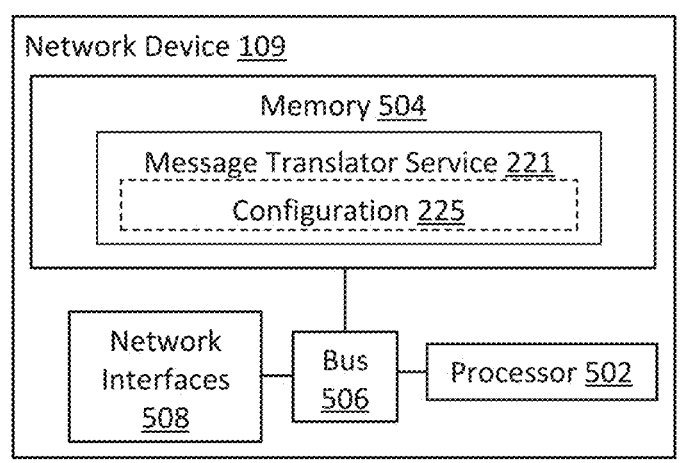
FIG. 5 is a schematic block diagram that provides one example illustration of a network device employed in the networked environment of FIG. 1 according to various embodiments of the present disclosure.

Next, in FIG. 5, shown is a block diagram depicting an example of a network device 109 used for implementing the techniques disclosed herein within a networked environment 100. The network device 109 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504.

The memory device 504 can store data and instructions that, when executed by the processing device 502, cause the processing device 502 to perform operations described herein. The memory device 504 may be a computer-readable medium, such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The network device 109 can include a bus 506 that can communicatively couple one or more components of the corresponding device. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a network device 109 to store and execute programming code.

The network device 109 also includes network interfaces 508, a portion of which may be one or more virtual network interfaces. The network interfaces 508 can include one or more a transceiving devices configured for communication using one or more network protocols. A non-limiting example, the network interfaces 508 can include 1000BASE-T interfaces that comply with the IEEE 802.3ab standard and can each include one or more components for establishing a network as described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as a network device or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A network switch, comprising:
   a plurality of network interfaces, wherein one of the network interfaces is configured to receive multicast messages from a control console;
   a processor;
   a memory accessible to the processor; and
   a message translator service executed by the processor, the message translator service causing the network switch to:
      obtain a configuration for translating a specified destination address of a specified type of multicast message to a different destination address;
      receive a message from the control console that includes an instruction for a group of network nodes, wherein the message includes a destination address;
      determine that the destination address matches the specified destination address and identifies the message as a multicast message and that the message matches the specified type of multicast message;
      generate a broadcast message based upon the multicast message and the configuration, wherein the broadcast message includes a broadcast address used as a destination address for the broadcast message and the broadcast address corresponds to the group of network nodes specified by the configuration; and
      transmit the broadcast message from one or more network interfaces specified by the configuration, wherein the broadcast message includes the instruction for the group of network nodes.

2. The network switch of claim 1, wherein the message translator service further causes the network switch to transmit the multicast message to at least one of the network interfaces associated with a multicast address of the multicast message.

3. The network switch of claim 1, further comprising withholding transmission of the broadcast message to other ones of the network interfaces that are not specified by the configuration.

4. The network switch of claim 1, wherein the configuration further specifies translating a universe identifier in the multicast message to a different universe identifier in the broadcast message.

5. The network switch of claim 1, wherein the broadcast message complies with the Art-Net protocol, and the multicast message complies with the Streaming Architecture for Control Networks (sACN) protocol.

6. The network switch of claim 1, wherein the configuration comprises a plurality of sets of criteria and corresponding actions for translating a plurality of types of messages.

7. The network switch of claim 1, wherein a portion of the group of network nodes are lighting equipment that complies with the DMX512 ("Digital Multiplex with 512 pieces of information") protocol, and another portion of the group of network nodes are gateways that receive the broadcast message and provide the instruction to the lighting equipment using the DMX512 protocol.

8. A method, comprising:
obtaining, in a network device, a configuration for translating a destination address of a specified type of multicast message to a different destination address;
receiving, in the network device, a message from a control console that includes an instruction for a group of network nodes, wherein the message includes a destination address;
determining, that the destination address matches the specified destination address and identifies the message as a multicast message and that the message matches a specified type of multicast message;
generating, in the network device, a broadcast message based upon the multicast message and the configuration, wherein the broadcast message includes a broadcast address used as a destination address for the broadcast message and the broadcast address corresponds to the group of network nodes specified by the configuration; and
transmitting, in the network device, the broadcast message from one or more network interfaces of the network device specified by the configuration, wherein the broadcast message includes the instruction for the group of network nodes.

9. The method of claim 8, further comprising transmitting the multicast message to at least one of the network interfaces of the network device associated with a multicast address of the multicast message.

10. The method of claim 8, further comprising withholding transmission of the broadcast message to other network interfaces that are not specified by the configuration.

11. The method of claim 8, wherein the configuration further specifies translating a universe identifier in the multicast message to a different universe identifier in the broadcast message.

12. The method of claim 8, wherein the broadcast message complies with the Art-Net protocol, and the multicast message complies with the Streaming Architecture for Control Networks (sACN) protocol.

13. The method of claim 8, wherein a portion of the group of network nodes are lighting equipment that complies with the DMX512 ("Digital Multiplex with 512 pieces of information") protocol, and another portion of the group of network nodes are gateways that receive the broadcast message and provide the instruction to the lighting equipment using the DMX512 protocol.

14. The method of claim 8, wherein the network device is a network switch, and the configuration for translating multicast messages is applied to one or more network interfaces of the network switch.

15. A non-transitory computer-readable medium embodying a program executable in a network device, comprising:
code that obtains a configuration for translating a destination address of a specified type of multicast message to a different destination address;
code that receives a message from a control console that includes an instruction for a group of network nodes, wherein the message includes a destination address;
code, that determines that the destination address matches the specified destination address and identifies the message as a multicast message and that the message matches the specified type of multicast message;
code that generates a broadcast message based upon the multicast message and the configuration, wherein the broadcast message includes a broadcast address used as a destination address for the broadcast message and the broadcast address corresponds to the group of network nodes specified by the configuration; and
code that transmits the broadcast message from one or more network interfaces of the network device specified by the configuration, wherein the broadcast message includes the instruction for the group of network nodes.

16. The non-transitory computer-readable medium of claim 15, wherein the program further comprises code that transmits the multicast message to at least one of the network interfaces associated with a multicast address of the multicast message.

17. The non-transitory computer-readable medium of claim 15, wherein the program further comprises code that withholds transmission of the broadcast message to other network interfaces that are not specified by the configuration.

18. The non-transitory computer-readable medium of claim 15, wherein the configuration further specifies translating a universe identifier in the multicast message to a different universe identifier in the broadcast message.

19. The non-transitory computer-readable medium of claim 15, wherein the broadcast message complies with the Art-Net protocol, and the multicast message complies with the Streaming Architecture for Control Networks (sACN) protocol.

20. The non-transitory computer-readable medium of claim 15, wherein the network device is a network switch, and the configuration for translating multicast messages is applied to one or more network interfaces of the network switch.

* * * * *